United States Patent
Duggirala et al.

(10) Patent No.: US 6,706,127 B1
(45) Date of Patent: Mar. 16, 2004

(54) LEAN MANUFACTURING PROCESS FOR MAKING BALL-SCREW RACKS

(75) Inventors: Ravikiran Duggirala, Farmington Hills, MI (US); Craig B. Chritz, Chesterfield, MI (US); Christopher J. Lehti, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/325,210

(22) Filed: Dec. 19, 2002

(51) Int. Cl.$^7$ .............................. C21D 9/36; C21D 8/10
(52) U.S. Cl. ................... 148/570; 148/572; 148/573; 148/587; 72/324; 72/370.16
(58) Field of Search ................. 148/570, 572, 148/573, 587; 72/324, 370.16

(56) References Cited

U.S. PATENT DOCUMENTS 5,428,208 A * 6/1995 Chatterjee et al. .......... 148/573

OTHER PUBLICATIONS

Leistritz News, Spring 1999.

* cited by examiner

*Primary Examiner*—Deborah Yee
(74) *Attorney, Agent, or Firm*—Michael D. Smith

(57) ABSTRACT

A method of making a ball-screw rack bar for use in a power steering mechanism of an automotive vehicle. Transverse rack teeth are cut in an exterior surface of a first end portion of a length of a bar stock. A ball-screw thread is cut in an exterior surface of a second end portion of the length of bar stock. The first end portion is heat-treated to a first hardness and the second end portion is heat-treated to a second hardness by passing an induction coil scanner lengthwise over the length of bar stock from one end to the other. The ball-screw thread is cut by whirling. Preferably the heat-treating is carried out after the cutting of the transverse rack teeth and before the cutting of the ball-screw thread. The rack bar produced by this method may be solid or hollow. The rack bar may be made by separately forming two lengths of bar stock and butt-welding them together, or they may be made from a solid length of bar stock.

10 Claims, 3 Drawing Sheets

LEAN MANUFACTURING PROCESS FOR MAKING BALL-SCREW RACKS

This invention relates to a method of making ball-screw racks for use in motor vehicles.

BACKGROUND OF THE INVENTION

Typically, ball-screw racks are made from a single, solid length of bar stock, and the manufacturing process involves a large number of steps, including the following:

1) Shear the bar and grind to size; 2) rough mill or broach rack teeth in one end portion of the bar; 3) heat-treat the end portion of the bar in which the rack teeth are formed, usually;by conduction hardening; 4) temper the heat-treated end portion of the bar; 5) straighten the bar; 6) rough grind a ball-screw thread groove in the other end portion of the bar; 7) heat-treat the other end portion of the bar, usually by induction hardening; 8) temper the other end portion of the bar; 9) straighten the bar; 10) finish mill the rack teeth; and 11) finish grind the ball-screw thread groove.

This typical manufacturing process is both time-consuming and expensive.

SUMMARY OF THE INVENTION

The manufacturing process of this invention involves fewer steps which can be summarized as follows:

1) shear the bar and grind to size; 2) rough mill or broach rack teeth in one end portion of the bar; 3) heat-treat the end portion of the bar in which the rack teeth are formed to one hardness in a first scan and the other end portion (on which a ball-screw thread is already manufactured or is to be manufactured) to a different hardness by induction hardening in a second scan; 4) temper the entire bar by induction; 5) straighten the bar; 6) form a ball-screw thread groove in the other end portion of the bar by whirling; and 7) finish mill the rack teeth.

Whirling, referred to in step 6, is a process in which a geometrically oriented cutter removes chips. Cutting is accomplished by a whirling ring rotating at high speed around a slowly rotating work piece. A whirling ring differs from a milling cutter in that the whirling ring uses cutting tools that face radially inwardly towards the center of the ring, not outwardly as on a milling cutter. Because most of the heat generated by whirling is carried away in the cut chips, whirling is done without a coolant and no subsequent heat treat or tempering is required. Hence the bar needs to be hardened and tempered only once, after milling the rack teeth, preferably by a single shot induction scan of the entire bar.

As indicated above, typical prior methods start with a solid length of bar stock and the end result is a solid rack bar. However, it has been discovered that by starting with tubular bar stock, or initially hollowing out a length of bar stock to make it tubular throughout a portion or all of its length, the finished rack bar is considerably lighter in weight without significant compromise on strength or performance.

It has also been discovered that a rack bar may be made starting with a rack end portion and a separate ball-screw end portion and butt welding the two together end-to-end. The rack end portion may be cut with rack teeth, heat treated, tempered and straightened, and the ball-screw end portion cut with a ball-screw thread groove, heat treated and tempered before the two end portions are resistance butt-welded together. The ball-screw end portion which is usually a few inches long, may, if desired, be cut from bar stock of much greater length, say 10 or 20 feet long. Bar stock with the ball-screw thread groove already formed in it by cold or profile rolling, and from which the ball-screw end portions may be cut, is readily available for purchase by the rack bar manufacturer. Each of the two end portions of the rack bar thus formed may be tubular or hollowed out if desired.

One object of this invention is to provide a manufacturing process for making ball-screw racks having the above features and capabilities.

Another object is to provide a process for making a ball-screw rack which involves fewer steps and less time and expense than processes presently in use. Reduction in multiple heat treat and straightening operations should improve quality of the ball-screw rack (teeth and screw form).

Other objectives, features and advantages of the invention will become more apparent as the following description proceeds, especially when considered with the accompanying drawings.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1:
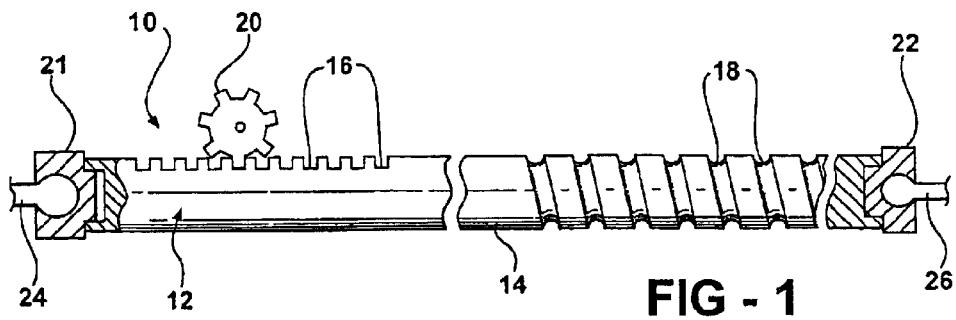
FIG. 1 is a side view, with parts broken away and in section, of a rack bar formed by the method of this invention, shown with tie rods connected to the ends.

Referring now more particularly to the drawings, there is shown in FIG. 1 an elongated ball-screw rack bar 10 adapted for use in a power steering mechanism of an automotive vehicle, having a rack end portion 12 and a ball-screw end portion 14.

The end portion 12 is formed with a series of axially spaced, transverse rack teeth 16. The end portion 14 is helically or spirally grooved to provide a ball-screw thread or thread groove 18. The rack teeth 16 are shown engaged by a pinion 20 adapted to be rotated by a steering shaft (not shown) of the vehicle to move the rack bar axially for turning the front wheels of the vehicle. The ends of the rack bar 10 are formed to receive couplings 21, 22 carried by tie rods 24, 26 attachable to the front wheels. The ball-screw thread groove 18 is part of a ball-screw power assist (not shown) for the rack bar.

Figure 2:
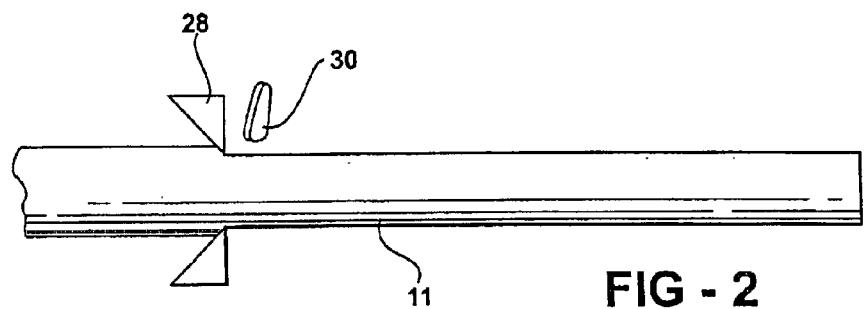
FIG. 2 is a semi-diagrammatic side view illustrating an initial step in which the rack bar is drawn and sheared.

The rack bar 10 is made in a series of steps which will now be described. A length of bar stock 11 is initially formed to size as by drawing through a die 28 or by other means such as grinding, and sheared to length by a cutter 30 (FIG. 2). Shearing to length can also be performed as a separate operation in a shearing machine. The ends of the length of bar stock 11 are machined to proper form for receiving the couplings 21, 22.

Figure 3:
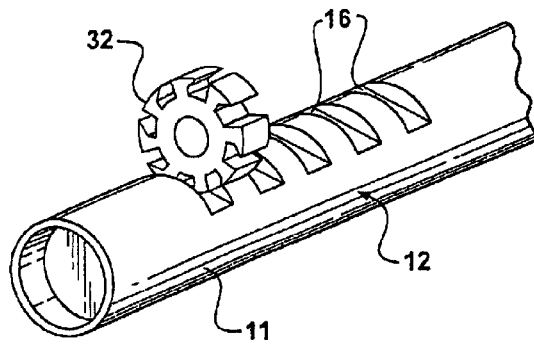
FIG. 3 is a semi-diagrammatic perspective view in which the rack teeth are cut in one end portion of the bar.

The formed and sheared length of bar stock 11 is rough milled, as by a milling cutter 32, or broached to form the axially spaced transverse rack teeth 16 in the end portion 12 of the rack bar (FIG. 3).

Figure 4:
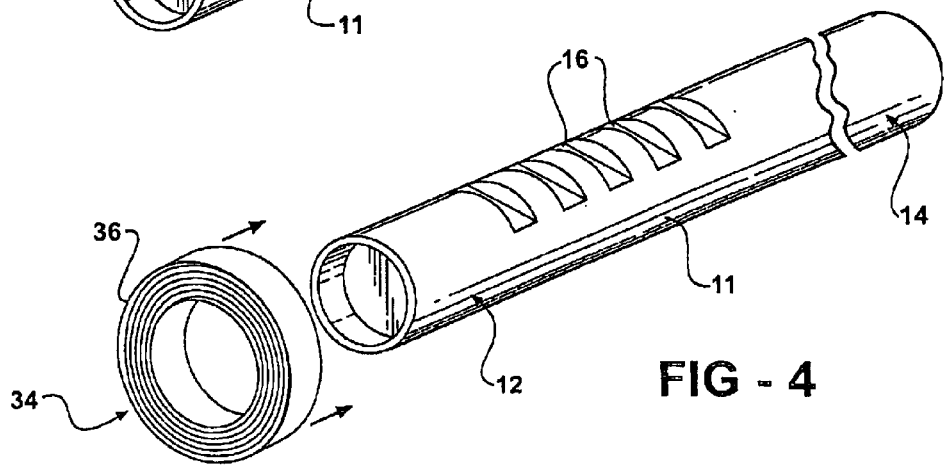
FIG. 4 is a semi-diagrammatic side view of a later step in the method in which the rack bar is heat-treated.

Thereafter, the entire length of bar stock 11 is hardened in a heat treating operation using an induction coil scanner 34 which is passed over the entire length of the bar (FIG. 4). The scanner 34 is in the form of a spiral coil 36 and the rack bar moves through the coil from one end to the other. In a first pass or scan, the coil is fired as the coil passes over the rack end portion 12 to harden the rack end portion 12 to one hardness, preferably a Rockwell C hardness of 60–62. In a second pass or scan, the coil is fired as the coil passes over the ball-screw end portion 14 to harden the ball-screw end portion 14 to a different hardness, preferably a Rockwell C hardness of 56–58. The length of bar stock 11 may then be tempered in a second pass of the scanner 34 with a suitable current set in the scanner coil 36 or another coil in a subsequent station for tempering. Both hardening and tempering are accomplished by induction heating process.

Figure 5:
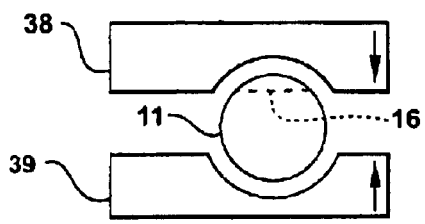
FIG. 5 is a semi-diagrammatic view in which the rack bar is straightened between dies.

The length of bar stock 11 may become warped as a result of the heat treatment and tempering, and is straightened between a pair of dies 38 and 39 (FIG. 5).

Figure 6:
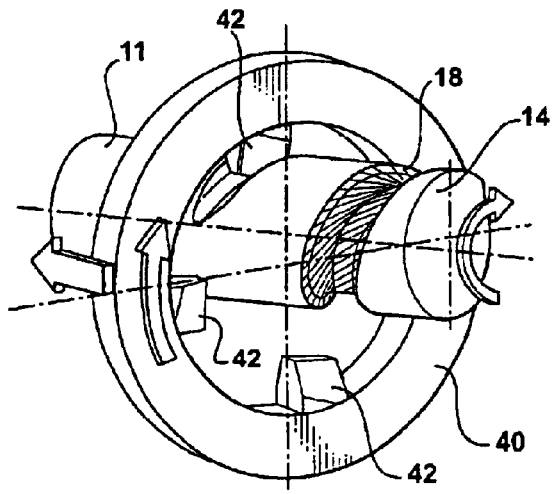
FIGS. 6 and 7 are diagrammatic views of the whirling action to form a ball-screw thread groove in the other end portion of the rack bar.
Figure 7:
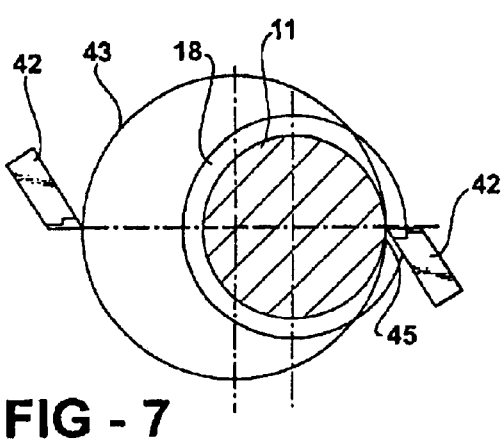

Following straightening, the ball-screw thread groove 18 is formed in the end portion 14 by whirling. Whirling is a well-known process and is shown in FIGS. 6 and 7. As shown, a whirling ring 40 has a plurality of cutting tools 42 that extend radially inwardly towards the center of the whirling ring. The cutting circle is designated 43. The length of bar stock 11 extends though the whirling ring 40 but its axis is laterally offset from the center of the whirling ring. The whirling ring 40 is axially rotated in one direction at a relatively high rate of speed while the length of bar stock 11 is axially rotated relatively slowly in the same direction. The whirling ring 40 is advanced axially to provide the desired thread pitch. As seen in FIG. 7, the lateral offset of the rack bar determines the depth of cut.

Most of the heat generated by whirling is carried away in the chips 45. Hence there is no warping of the bar stock as a result of whirling and accordingly there is no need for subsequent straightening.

As a further step in the process, the rack teeth may be finish milled if necessary, although if initially formed by broaching, finish milling is usually not needed. The end result is the rack bar 10.

Figure 8:
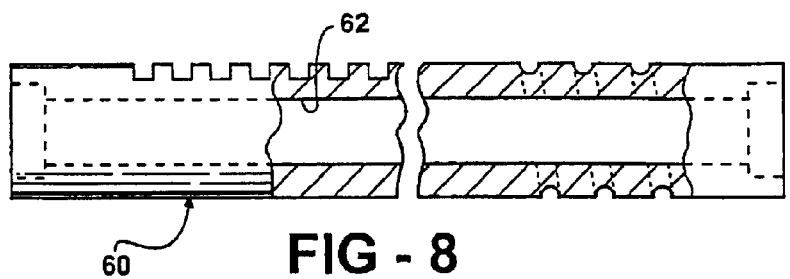
FIG. 8 is a side view, with parts broken away and in section, of a rack bar of another construction.

Referring now to FIG. 8 there is shown a rack bar 60 which is like the rack bar 10, except that the rack bar 60 is tubular. The tubular rack bar 60 may be made from a length of tubular bar stock 61 (FIG. 9) formed by extrusion to provide an inside diameter 62 which is uniform throughout the length of the bar, then ground to the correct outside diameter and sheared to the desired length in the manner shown in FIG. 2. The tubular bar is then rough milled or broached to form the rack teeth, heat-treated, tempered, straightened, subjected to whirling to form the ball-screw thread groove, and then the rack teeth may be finished milled, all as set forth above in the method of making the rack bar 10. The tubular rack bar 60 has substantially the same strength as the rack bar 10 but requires less material to make and is considerably lighter in weight.

Figure 9:
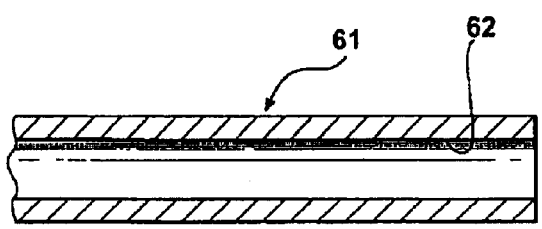
FIG. 9 is a sectional view, with parts broken away, of a length of tubular bar stock used in making the rack bar of FIG. 8.
Figure 10:
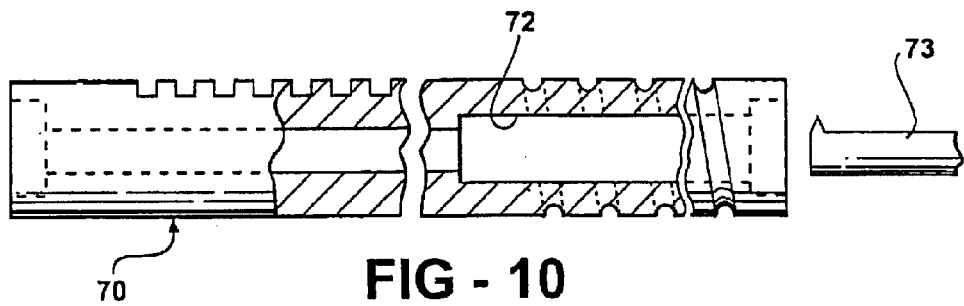
FIG. 10 is a side view, with parts broken away and in section, of a rack bar of another construction.

FIG. 10 shows a tubular rack bar 70 which may be made from the length of tubular bar stock 61 in FIG. 9. The rack bar 70 is like the tubular rack bar 60, except that the inside diameter of the rack bar 70 is enlarged in the ball-screw end portion 14 as shown at 72. The enlargement of the inside diameter of the ball-screw end portion 14 may be accomplished by any suitable means as by broaching or by counterboring the length of bar stock 61 using a gun drill 73 or by hydraforming, or by rotary swaging using hammer heads to beat the smaller diameter into a larger diameter over a mandrel in the tube. After enlargement of the inside diameter, the rack bar 70 may be made following the same steps described for making the rack bar 60.

Figure 11:
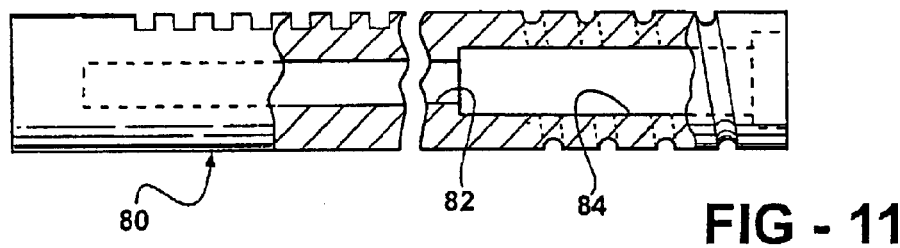
FIG. 11 is a side view, with parts broken away and in section, showing still another rack bar.
Figure 12:
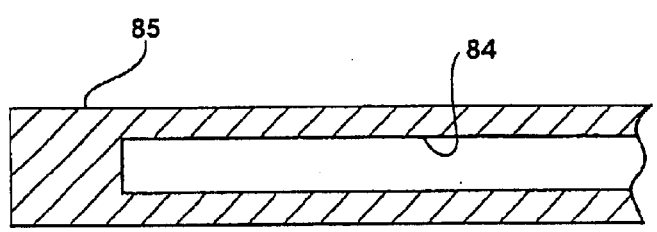
FIG. 12 is a sectional view with parts broken away, of a length of bar stock used in making the rack bar of FIG. 11.

FIG. 11 shows a rack bar 80 which is like the rack bar 70, except that the smaller inside diameter portion 82 dead-ends inside the rack bar, that is it does not extend all the way through to the end of the rack bar. The rack bar 80 may be formed initially from solid bar stock by backward extruding to first form the larger inside diameter portion where indicated at 84. The length of bar stock with the large inside diameter portion 84 is shown in FIG. 12 at 85. The smaller diameter portion may then be machined with a gun drill, like the gun drill 73 in FIG. 9. Alternatively, the smaller inside diameter could be first machined using a gun drill, and then the larger diameter portion counterbored. After forming the inside diameter, the rack bar 80 may be made following the same steps described for making the rack bar 60.

Figure 13:
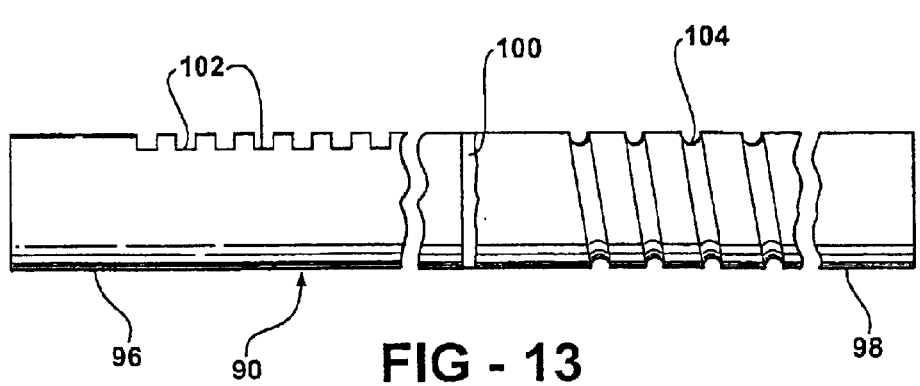
FIG. 13 is a side view with parts broken away of another rack bar.

Referring to FIG. 13, there is shown a rack bar 90 which is like the rack bar 10, except that the rack bar 90 is made from two lengths of bar stock, 92 and 94. The length of bar stock 92 provides a rack end portion 96 and the length of bar stock 94 provides a ball-screw end portion 98. The two lengths of bar stock are initially separate from one another and then butt-welded together end-to-end where indicated at 100. When butt-welded together, the rack bar 90, including its two end portions, one with rack teeth 102 and the other with a ball-screw thread groove 104, is exactly the same as the rack bar 10. However, the method of making the rack bar 90 is different from the method of making the rack bar 10, and will now be described.

Figure 14:
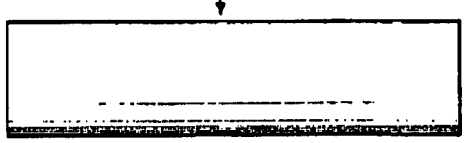
FIG. 14 is a side view of a length of stock for forming one end portion of the rack bar of FIG. 13.

The rack end portion 96 of the rack bar 90 is formed to size as by drawing the length of bar stock 92 (FIG. 14) through a die similar to the die 28 in FIG. 2 or by other means such as grinding and sheared to length by a suitable cutter such as the cutter 30 in FIG. 2.

The formed and sheared rack end portion 96 is then rough milled, as by the milling cutter 32, or broached, to form the axially spaced transverse rack teeth 102. An interface geometry for subsequent resistant butt welding is also machined.

Thereafter the rack end portion 96 is hardened in a heat-treating operation using an induction coil scanner such as the scanner 34 shown in FIG. 4 which is passed over the entire length of the rack end portion 96. By this means, the rack end portion 96 is suitably hardened, preferably to a Rockwell C hardness of 60–62. The heat-treat is accomplished in one pass of the scanner 34. The rack end portion 96 may then be tempered in a second pass of the scanner 34. Both hardening and tempering are accomplished by induction heating. The rack end portion 96 is then straightened between a pair of dies similar to the dies 38 and 40 in FIG. 5.

Figure 15:
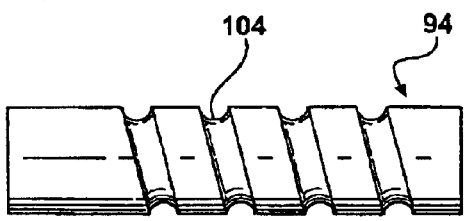
FIG. 15 is a side view of a length of stock for forming the other end portion of the rack bar of FIG. 13.

The ball-screw end portion 98 is made from the length of bar stock 94. The ball-screw thread groove 104 may be formed therein by whirling as described above in connection with the rack bar 10. FIG. 15 shows the length of bar stock 94 with the thread groove 104 formed in it. The ball-screw end portion 98 is hardened in a heat-treating operation by an induction coil scanner such as the scanner 34 as in FIG. 4, which is passed over the entire length of the ball-screw end portion 98 in a single shot. The ball-screw end portion is thus hardened, preferably to a Rockwell C hardness of 56–58. The ball-screw end portion 98 may then be tempered in a second pass of the scanner 34. It is not necessary to straighten the ball-screw end portion 98 because there is little heat generated by whirling and hence no appreciable distortion.

Alternatively, the ball-screw end portion 98 which is usually only a few inches long, may if desired, be cut from bar stock of much greater length having the ball-screw thread groove already formed into it by a process such as cold profile rolling. Such bar stock is readily available on the market and can be purchased by the rack bar manufacturer. If the ball-screw end portion 98 is cut from a purchased length of bar stock, it can be assumed that the length of bar stock is straight and therefore that no straightening of the cut ball-screw end portion is needed. The interface geometry for resistance butt-welding will have to be machined on one end.

Having thus made the end portions 96 and 98 in separate processes, the two may then be joined together end-to-end by resistance butt-welding where indicated at 100.

It will be understood that the individual end portions 92 and 94 may be solid or may be cored out or tubular in a manner similar to that described in connection with the formation of the rack bars 60, 70 and 80.

What is claimed is:

1. A method making a ball-screw rack bar for use in a power steering mechanism of an automotive vehicle, comprising:

providing a length of bar stock of a predetermined diameter and at least partially hollow, cutting transverse rack teeth in an exterior surface of a first end portion of the length of bar stock, cutting a ball-screw thread in an exterior surface of a second end portion of the length of bar stock by whirling, before or after the cutting of the ball-screw thread, heat treating the first end portion of the length of bar stock to a first hardness and the second end portion of the length of bar stock to a second hardness different from the first hardness by passing an induction coil scanner lengthwise over the length of bar stock from one end of the length of bar stock to the other.

2. The method of claim 1, wherein the heat-treating of the first and second end portions of the length of bar stock is carried out after the cutting of the transverse rack teeth and before the cutting of the ball-screw thread.

3. The method of claim 2, wherein said length of bar stock is tubular.

4. A method of making a ball-screw rack bar for use in a power steering mechanism of an automotive vehicle comprising:

providing a first length of bar stock, cutting transverse rack teeth in an exterior surface of the first length of bar stock and then heat treating the first length of bar stock, providing a second length of bar stock, cutting a ball-screw thread in an exterior surface of the second length of bar stock, and then heat treating the second length of bar stock, and thereafter rigidly securing together said first and second lengths of bar stock in an end-to-end relationship.

5. The method of claim 4, wherein the heat-treating of the first length of bar stock is carried out by induction heating.

6. The method of claim 4, wherein the heat-treating of the first length of bar stock is carried out by passing an induction coil scanner lengthwise over the first length of bar stock from one end to the other.

7. The method of claim 4, wherein the cutting of the ball-screw thread in the exterior surface of the second length of bar stock is carried out by whirling.

8. The method of claim 7, wherein the heat-treating of the first length of bar stock is carried out by passing an induction coil scanner lengthwise over the first length of bar stock from one end to the other.

9. The method of claim 8, wherein one or both of said lengths of bar stock are solid.

10. The method of claim 8, wherein one or both of said lengths of bar stock are at least partially hollow.

* * * * *